US012468980B2

(12) United States Patent
Suneja et al.

(10) Patent No.: US 12,468,980 B2
(45) Date of Patent: Nov. 11, 2025

(54) COMPLEXITY BASED ARTIFICIAL INTELLIGENCE MODEL TRAINING

(71) Applicant: International Business Machines Corporation, Armonk, NY (US)

(72) Inventors: Sahil Suneja, Ossining, NY (US); Yufan Zhuang, New York, NY (US); Yunhui Zheng, Chappaqua, NY (US); Alessandro Morari, New York, NY (US); Jim Alain Laredo, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 915 days.

(21) Appl. No.: 17/491,275

(22) Filed: Sep. 30, 2021

(65) Prior Publication Data

US 2023/0115723 A1   Apr. 13, 2023

(51) Int. Cl.
*G06N 20/00* (2019.01)
*G06F 18/24* (2023.01)
*G06N 20/20* (2019.01)

(52) U.S. Cl.
CPC ............. *G06N 20/00* (2019.01); *G06F 18/24* (2023.01); *G06N 20/20* (2019.01)

(58) Field of Classification Search
CPC ........ G06N 20/20; G06N 3/045; G06N 3/044; G06N 3/088; G06N 3/0418; G06N 3/047; G06N 20/00; G06N 20/10; G06F 8/31; G06F 8/71; G06F 17/11; G06F 8/20; G06F 8/75; G06F 8/77; G06F 40/40;
(Continued)

(56) References Cited

U.S. PATENT DOCUMENTS 10,606,910 B2    3/2020   Govindarajan et al.
10,789,367 B2 *  9/2020   Joseph Durairaj .... G06N 3/043
(Continued)

FOREIGN PATENT DOCUMENTS

CA    3005241 A1 * 11/2018  ............. G06N 3/082
CA    3059314 C  *  7/2023  ............. G06N 3/042
(Continued)

OTHER PUBLICATIONS

"Juliet Test Suite for C/C++ Version 1.3", URL: https://doi.org/10.6028/NIST.TN. 1995, NIST, 2017, 36 pages.
(Continued)

*Primary Examiner* — Steven P Sax
(74) *Attorney, Agent, or Firm* — Amin, Turocy & Watson, LLP

(57) ABSTRACT

Techniques regarding training one or more AI models for a source code understanding task are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a training component that can train an artificial intelligence model on source code samples for a source code understanding task. The source code samples can be ranked based on code complexity.

20 Claims, 12 Drawing Sheets

(58) Field of Classification Search
CPC ...... G06F 16/9035; G06F 8/36; G06F 16/906; G06F 8/72

See application file for complete search history.

(56) References Cited

U.S. PATENT DOCUMENTS

| | | | | |
|---|---|---|---|---|
| 11,113,175 | B1* | 9/2021 | Adamo | G06F 40/216 |
| 2016/0162473 | A1* | 6/2016 | Cogley | G06F 40/51 704/9 |
| 2017/0031800 | A1 | 2/2017 | Shani et al. | |
| 2018/0373507 | A1* | 12/2018 | Mizrahi | G06F 18/24 |
| 2019/0079759 | A1* | 3/2019 | Kadam | G06F 8/77 |
| 2019/0324744 | A1* | 10/2019 | Alam | G06F 8/31 |
| 2020/0073784 | A1 | 3/2020 | Cheng et al. | |
| 2020/0379609 | A1* | 12/2020 | Jacob | G06F 9/453 |
| 2021/0125001 | A1 | 4/2021 | Guo et al. | |
| 2021/0185492 | A1* | 6/2021 | Higuchi | H04W 4/40 |

FOREIGN PATENT DOCUMENTS

| | | | | |
|---|---|---|---|---|
| CA | 3078935 | C | * 8/2023 | G06F 8/60 |
| CN | 103593661 | B | 9/2016 | |
| CN | 107066384 | A | 8/2017 | |
| CN | 107862327 | B | 3/2018 | |
| CN | 109783361 | A | 5/2019 | |
| CN | 109947652 | A | 6/2019 | |
| CN | 110008680 | A | * 7/2019 | G06F 21/36 |
| CN | 110460340 | A | * 11/2019 | H03M 13/35 |
| CN | 111163351 | A | 5/2020 | |
| CN | 111402303 | A | * 7/2020 | G06T 7/277 |
| CN | 111913702 | A | 11/2020 | |
| CN | 112131362 | A | 12/2020 | |
| CN | 112199293 | A | 1/2021 | |
| CN | 115935177 | A | 4/2023 | |
| FR | 2908909 | A1 | * 5/2008 | G06F 21/629 |
| JP | 2023-051815 | A | 4/2023 | |
| WO | WO-2019057700 | A1 | * 3/2019 | G06F 8/70 |
| WO | 2020120301 | A1 | 6/2020 | |

OTHER PUBLICATIONS

Panthaplackel et al., "Learning to Update Natural Language Comments Based on Code Changes", Proceedings of the 58th Annual Meeting of the Association for Computational Linguistics, Jul. 5-10, 2020, 16 pages.

Pascarella et al., "On the performance of method-level bug prediction: A negative result", The Journal of Systems & Software, vol. 161, 2020, 22 pages.

Patra et al., "Semantic Bug Seeding: A Learning Based Approach for Creating Realistic Bugs", ESEC/FSE, Association for Computing Machinery, Aug. 23-28, 2021, pp. 906-918.

Pradel et al., "DeepBugs: A Learning Approach to Name-Based Bug Detection", Proceedings of the ACM on Programming Languages, 2(OOPSLA), Article 147, Nov. 2018, pp. 1-25.

Rabin et al., "Understanding Neural Code Intelligence through Program Simplification", Proceedings of the 29th ACM Joint Meeting on European Software Engineering Conference and Symposium on the Foundations of Software Engineering , ESEC/FSE, Aug. 23-28, 2021, 12 pages.

Ribeiro et al., ""Why should I trust you?" Explaining the Predictions of any Classifier", Proceedings of the 22nd Acm Sigkdd International Conference on Knowledge Discovery and Data Mining, 2016, 10 pages.

Roy et al., "Bug Synthesis: Challenging Bug-Finding Tools with Deep Faults", Proceedings of the 26th ACM Joint Meeting on European Software Engineering Conference and Symposium on the Foundations of Software Engineering , ESEC/FSE, Nov. 4-9, 2018, pp. 224-234.

Russell et al., "Automated Vulnerability Detection in Source Code Using Deep Representation Learning", 17th IEEE International Conference on Machine Learning and Applications, 2018, 7 pages.

Selvaraju et al., "Grad-Cam: Visual Explanations from Deep Networks via Gradient-Based Localization", Proceedings of the IEEE international conference on computer vision, 2017, 24 pages.

Sestili et al., "Towards security defect prediction with AI", URL: https://arxiv.org/pdf/1808.09897.pdf, 2018, 11 pages.

Shorten et al., "A survey on image data augmentation for deep learning", Journal of Big Data, vol. 6, No. 60, 2019, op. 1-48.

Shrikumar et al., "Learning Important Features Through Propagating Activation Differences", Proceedings of the 34th International Conference on Machine Learning, 2017, 9 pages.

Sundararajan et al., "Axiomatic Attribution for Deep Networks", Proceedings of the 34th International Conference on Machine Learning, 2017, 11 pages.

Suneja et al., "Learning to map source code to software vulnerability using code-as-a-graph", URL: https://arxiv.org/ftp/arxiv/papers/2006/2006.08614.pdf, 2020, pp. 1-8.

Suneja et al., "Probing Model Signal-Awareness via Prediction-Preserving Input Minimization", Proceedings of the 29th ACM Joint Meeting on European Software Engineering Conference and Symposium on the Foundations of Software Engineering, ESEC/FSE, 2021, pp. 945-955.

Mckay, Peter, "Accelerating our developer-first vision with DeepCode", URL: https://snyk.io/blog/accelerating-developer-first-vision-with-deepcode/, Snyk Team, Sep. 23, 2020, pp. 1-5.

Tufano et al., "On Learning Meaningful Code Changes via Neural Machine Translation", Proceedings of the 41st International Conference on Software Engineering, IEEE/ACM, May 25-31, 2019, pp. 25-36.

Tufano et al., "An Empirical Study on Learning Bug-Fixing Patches in the Wild via Neural Machine Translation", ACM Transactions on Software Engineering and Methodology, vol. 28, No. 4, Article 19, Sep. 2019, pp. 1-29.

Tufano et al., "Learning How to Mutate Source Code from Bug-Fixes", International Conference on Software Maintenance and Evolution, IEEE, Sep. 29-Oct. 4, 2019, 12 pages.

Veličković et al., "Graph Attention Networks", International Conference on Learning Representations, 2018, pp. 1-12.

Xie et al., "Crystal Graph Convolutional Neural Networks for an Accurate and Interpretable Prediction of Material Properties", Physical Review Letters, vol. 120, No. 14, 2018, pp. 1-9.

Yamaguchi et al., "Modeling and Discovering Vulnerabilities with Code Property Graphs", IEEE Symposium on Security and Privacy, 2014, 15 pages.

Yang et al., "A Survey on Deep Learning for Software Engineering", ACM Comput. Surv., vol. 1, No. 1, Article 1, Jan. 2020, pp. 1-35.

Ying et al., "GNNExplainer: Generating Explanations for Graph Neural Networks", 33rd Conference on Neural Information Processing Systems, 2019, pp. 1-13.

Yu et al., "Seqgan: Sequence Generative Adversarial Nets with Policy Gradient", Proceedings of the AAAI Conference on Artificial Intelligence, vol. 31, 2017, 11 pages.

Zeller, Andreas, "Isolating Cause-Effect Chains from Computer Programs", Proceedings of the 10th ACM SIGSOFT Symposium on Foundations of Software Engineering, SIGSOFT '02/FSE-10, Nov. 18-22, 2002, pp. 1-10.

Zeller et al., "Simplifying and Isolating Failure Inducing Input", IEEE Transactions on Software Engineering, vol. 28, No. 2, Feb. 2002, pp. 1-17.

Zhang et al., "Towards Stable and Efficient Training of Verifiably Robust Neural Networks", International Conference on Learning Representations, 2019, pp. 1-25.

Zhao et al., "On the Impact of Sample Duplication in Machine Learning-Based Android Malware Detection", ACM Transactions on Software Engineering and Methodology, vol. 30, No. 3, Article 40, May 2021, pp. 1-38.

Zheng et al., "D2A: A Dataset Built for Al-Based Vulnerability Detection Methods Using Differential Analysis", Proceedings of the ACM/IEEE 43rd International Conference on Software Engineering: Software Engineering in Practice, 2021, 10 pages.

Madry, et al., "Towards Deep Learning Models Resistant to Adversarial Attacks," 2018 In International Conference on Learning Representation, 2018.

(56) References Cited

OTHER PUBLICATIONS

SNYK Team. Accelerating our developer-first vision with DeepCode. https://snyk.io/blog/accelerating-developer-first-vision-with-deepcode/. Sep. 23, 2020.
Zhou, et al., Devign: Effective Vulnerability Identification by Learning Comprehensive Program Semantics via Graph Neural Networks. In Advances in Neural Information Process, arXiv:1909.03496v1 [cs.SE] Sep. 8, 2019.
Github, "Risk Assessment of GitHub Copilot", URL: https://gist.github.com/0xabad1dea/be18e11beb2e12433d93475d72016902, 0xabad1dea, Jul. 2021, pp. 1-21.
Adebayo et al., "Sanity checks for saliency maps", Proceedings of the 32nd International Conference on Neural Information Processing Systems, 2018, 30 pages.
Ahluwalia et al., "Snoring: a noise in defect prediction datasets", Proceedings of the 16th International Conference on Mining Software Repositories, 2019, pp. 63-67.
Allamania et al., "Suggesting Accurate Method and Class Names", Proceedings of the 10th Joint Meeting on Foundations of Software Engineering, Aug. 30-Sep. 4, 2015, pp. 38-49.
Allamanis et al., "Learning to Represent Programs with Graphs", ICLR, 2018, pp. 1-17.
Allamanis et al., "A Convolutional Attention Network for Extreme Summarization of Source Code", ICML, vol. 48, 2016, 11 pages.
Bader et al., "AI in Software Engineering at Facebook", IEEE Software, vol. 38, No. 4, Jul.-Aug. 2021, pp. 52-61.
Bangash et al., "On the time-based conclusion stability of cross-project defect prediction models", Empirical Software Engineering, vol. 25, No. 6, Sep. 9, 2020, 38 pages.
Bavishi et al., "Context2Name: A Deep Learning-Based Approach to Infer Natural Variable Names from Usage Contexts", URL: https://arxiv.org/pdf/1809.05193.pdf, Aug. 31, 2018, pp. 1-13.
Zhou et al., "Learning Deep Features for Discriminative Localization", IEEE Conference on Computer Vision and Pattern Recognition (CVPR), 2016, pp. 1-10.
Bennaceur et al., "Machine Learning for Software Analysis: Models, Methods, and Applications", Lecture Notes in Computer Science, vol. 11026, 2018, pp. 3-49.
Bielik et al., "Adversarial Robustness for Code", Proceedings of the 37th International Conference on Machine Learning, ICML, Virtual Event (Proceedings of Machine Learning Research, vol. 119), Jul. 13-18, 2020, 18 pages.
Brown et al., "The Care and Feeding of Wild-Caught Mutants", Proceedings of the 11th Joint Meeting on Foundations of Software Engineering, Sep. 4-8, 2017, 511-522.
Brown et al., "Language models are few-shot learners", URL: https://arxiv.org/pdf/2005.14165.pdf, 2020, pp. 1-75.
Chakraborty et al., "Bias in Machine Learning Software: Why? How? What to do?", 29th ACM Joint European Software Engineering Conference and Symposium on the Foundations of Software Engineering, ACM, Aug. 23-28, 2021, 12 pages.
Chawla et al., "SMOTE: Synthetic Minority Over-sampling Technique", Journal of Artificial Intelligence Research, vol. 16, Jun. 2002, pp. 321-357.
Ciniselli et al., "An Empirical Study on the Usage of BERT Models for Code Completion", 18th IEEE/ACM International Conference on Mining Software Repositories, MSR, May 17-19, 2021, 12 pages.
Cuoq et al., "Frama-C", International Conference on Software Engineering and Formal Methods, Springer, Oct. 2012, 16 pages.
Dam et al., "Automatic Feature Learning for Predicting Vulnerable Software Components", IEEE Transactions on Software Engineering, vol. 14, No. 8, Aug. 2015, pp. 1-19.
Dinella et al., "Hoppity: Learning graph transformations to detect and fix bugs in programs", International Conference on Learning Representations (ICLR), 2020, pp. 1-17.
Dolan-Gavitt et al., "LAVA: Large-Scale Automated Vulnerability Addition", IEEE Symposium on Security and Privacy (SP), 2016, pp. 110-121.
"Infer Static Analyzer", URL: https://fbinfer.com/, Facebook, retrieved on Oct. 28, 2021, pp. 1-5.
Garg et al., "Learning to Predict Vulnerabilities From Vulnerability-Fixes: A Machine Translation Approach", URL: https:/arxiv.org/pdf/2012.11701.pdf, 2020, 12 pages.
Github, "Your AI pair programmer", URL: https://copilot.github.com/, 2021, 12 pages.
Golagha et al., "Can We Predict the Quality of Spectrum based Fault Localization?", 13th IEEE International Conference on Software Testing, Validation and Verification, ICST, IEEE, Oct. 24-28, 2020, pp. 4-15.
Gowal et al., "On the Effectiveness of Interval Bound Propagation for Training Verifiably Robust Models", URL: https://arxiv.org/pdf/1810.12715.pdf, 2018, 16 pages.
Graves et al., "Automated Curriculum Learning for Neural Networks", Proceedings of the 34th International Conference on Machine Learning, PMLR, vol. 70, 2017, 10 pages.
Gros et al., "Code to Comment "Translation": Data, Metrics, Baselining & Evaluation", 35th IEEE/ACM International Conference on Automated Software Engineering, ASE, IEEE, Sep. 21-25, 2020, pp. 746-757.
Guo et al., "LEMNA: Explaining Deep Learning based Security Applications", Proceedings of the Acm Sigsac Conference on Computer and Communications Security, Oct. 15-19, 2018, 16 pages.
Gupta et al., "Locating Faulty Code Using Failure-Inducing Chops", Proceedings of the 20th IEEE/ACM International Conference on Automated Software Engineering, Nov. 7-11, 2005, pp. 263-272.
Hacohen et al., "On The Power of Curriculum Learning in Training Deep Networks", Proceedings of the 36th International Conference on Machine Learning, Proceedings of Machine Learning Research, vol. 97, 2019, 13 pages.
Yer et al., "Summarizing Source Code using a Neural Attention Model", Proceedings of the 54th Annual Meeting of the Association for Computational Linguistics, Aug. 7-12, 2016, pp. 2073-2083.
Kim et al., "Code Prediction by Feeding Trees to Transformers", 43rd IEEE/ACM International Conference on Software Engineering, ICSE, May 22-30, 2021, pp. 150-162.
Kingma et al., "Adam: A Method for Stochastic Optimization", URL: https://arxiv.org/pdf/1412.6980.pdf, 2017, pp. 1-15.
Laidlaw et al., "Perceptual Adversarial Robustness: Defense Against Unseen Threat Models", International Conference on Learning Representations, 2020, pp. 1-22.
Li et al., "Gated Graph Sequence Neural Networks", International Conference on Learning Representations, 2017, pp. 1-20.
Li et al., "SySeVR: A Framework for Using Deep Learning to Detect Software Vulnerabilities", URL: https://arxiv.org/pdf/1807.06756v2.pdf, 2018, pp. 1-13.
Li et al., "VulDeePecker: A Deep Learning-Based System for Vulnerability Detection", 25th Annual Network and Distributed System Security Symposium, Feb. 18-21, 2018, pp. 1-15.
Liu et al., "Multi-task Learning based Pretrained Language Model for Code Completion", 35th IEEE/ACM International Conference on Automated Software Engineering, Sep. 21-25, 2020. pp. 473-485.
Iu et al., "Learning to Spot and Refactor Inconsistent Method Names", Proceedings of the 41st International Conference on Software Engineering, May 25-31, 2019, pp. 1-12.
"Lizard", A simple code complexity analyser, URL: https://github.com/terryyin/lizard, 2012, pp. 1-9.
Lou et al., "Boosting Coverage-Based Fault Localization via Graph-Based Representation Learning", 29th ACM Joint European Software Engineering Conference and Symposium on the Foundations of Software Engineering, ACM, Aug. 23-28, 2021, pp. 664-676.
Lundberg et al., "A unified approach to interpreting model predictions", 31st Conference on Neural Information Processing Systems, Advances in Neural Information Processing Systems, 2017, pp. 1-10.
Zhou et al., "Devign: Effective Vulnerability Identification by Learning Comprehensive Program Semantics via Graph Neural Networks", Advances in Neural Information Processing Systems (NeurIPS) 32, 2019, pp. 1-11.

(56) References Cited

OTHER PUBLICATIONS

Mazuera-Rozo et al., "Shallow or Deep? An Empirical Study on Detecting Vulnerabilities using Deep Learning", 29th IEEE/ACM International Conference on Program Comprehension, May 20-21, 2021, 12 pages.

"pmccabe: McCabe style function complexity and line counting for C and C++", URL: https://people.debian.org/~bame/pmccabe, McCabe, 1992-2021, pp. 1-2.

Mirshokraie et al., "Efficient JavaScript Mutation Testing", 2013 IEEE Sixth International Conference on Software Testing, Verification and Validation, 2013, pp. 74-83.

Misherghi et al., "HDD: Hierarchical Delta Debugging", Proceedings of the 28th International Conference on Software Engineering, May 20-28, 2006, 10 pages.

Mohapatra et al., "Towards Verifying Robustness of Neural Networks against a Family of Semantic Perturbations", Proceedings of the IEEE/CVF Conference on Computer Vision and Pattern Recognition, 2020, pp. 1-12.

Nguyen et al., "FOCUS: A Recommender System for Mining API Function Calls and Usage Patterns", Proceedings of the 41st International Conference on Software Engineering, May 25-31, 2019, pp. 1050-1060.

Bengio, Yoshua et al., "Curriculum Learning", Proceedings of the 26th International Conference on Machine Learning; Montreal, Canada 2009. (8 pages).

Madry, Aleksander et al., "Towards Deep Learning Models Resistant to Adversarial Attacks", ArXiv: 1706.06083v4, Sep. 4, 2019. (28 pages).

The State Intellectual Property Office of People's Republic of China, "First Office Action", Apr. 25, 2025, 14 Pages, CN Application No. 202211057696.2.

The State Intellectual Property Office of People's Republic of China, "Second Office Action", Sep. 29, 2025, 16 Pages, CN Application No. 202211057696.2.

\* cited by examiner

COMPLEXITY BASED ARTIFICIAL INTELLIGENCE MODEL TRAINING

BACKGROUND

The subject disclosure relates to incorporating complexity awareness into the training of one or more artificial intelligence models, and more specifically, to the ranking of source code samples based on complexity to facilitate training an artificial intelligence model for one or more source code understanding tasks.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can incorporate complexity awareness into artificial intelligence model training are described.

According to an embodiment, a system is provided. The system can comprise a memory that stores computer executable components. The system can also comprise a processor, operably coupled to the memory, and that can execute the computer executable components stored in the memory. The computer executable components can comprise a training component that can train an artificial intelligence model on source code samples for a source code understanding task. The source code samples can be ranked based on code complexity.

According to an embodiment, a computer-implemented method is provided. The computer-implemented method can comprise training, by a system operatively coupled to a processor, an artificial intelligence model on source code samples for a source code understanding task. The source code samples can be ranked based on code complexity.

According to an embodiment, a computer program product for employing source code complexity awareness with an artificial intelligence model is provided. The computer program product can comprise a computer readable storage medium having program instructions embodied therewith. The program instructions can be executable by a processor to cause the processor to train, by the processor, the artificial intelligence model on source code samples for a source code understanding task. The source code samples can be ranked based on code complexity.

DETAILED DESCRIPTION

Figure 1:
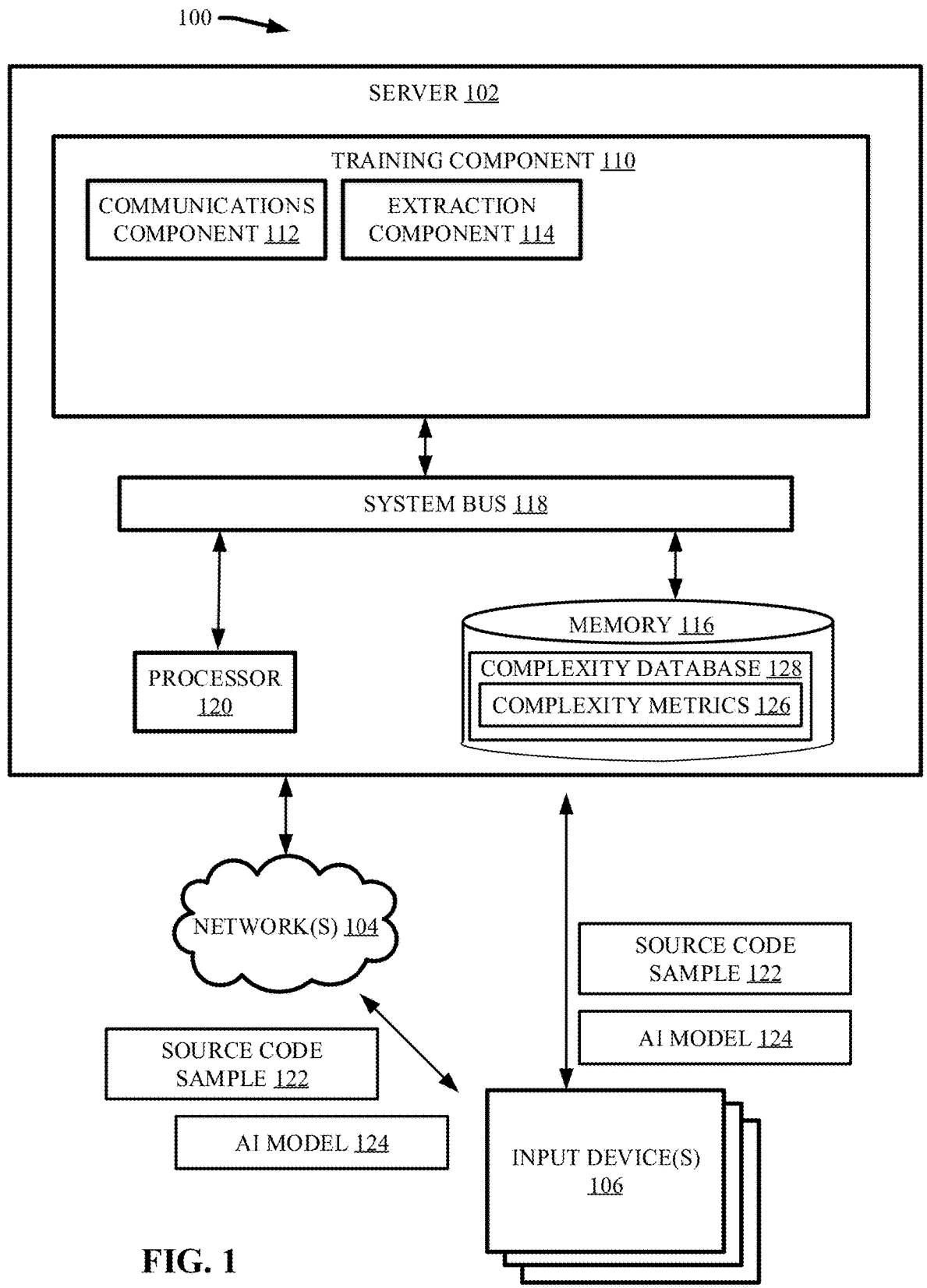
FIG. 1 illustrates a block diagram of an example, non-limiting system that can extract one or more complexity metrics regarding one or more source codes in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Artificial intelligence ("AI") models are employed in a variety of source code understanding tasks, such as: defect detection, code summarization, code completion, bug fixing, function and variable naming, code recommendation, software development workflows, a combination thereof, and/or the like. However, AI model quality can be impeded based on whether the model is learning task-relevant aspects of a source code, especially when small input perturbations can lead to incorrect predictions.

Various embodiments of the present invention can be directed to computer processing systems, computer-implemented methods, apparatus and/or computer program products that facilitate the efficient, effective, and autonomous (e.g., without direct human guidance) AI model training that can incorporate code complexity awareness. For example, one or more embodiments described herein can train one or more AI models via source code samples based on code complexity. For instance, one or more embodiments herein can extract one or more complexity metrics from source code samples included in a training dataset. Further, various embodiments described herein can rank the source code samples based on the extracted complexity metrics. Additionally, one or more embodiments described herein can feed the source code samples to the AI model for training based on the ranking. For example, the AI model can be trained on source code samples in order of the complexity of the source codes. For instance, the complexity of the source code samples employed to train the AI model can increase throughout execution of the training.

The computer processing systems, computer-implemented methods, apparatus and/or computer program products employ hardware and/or software to solve problems that are highly technical in nature (e.g., training an AI model), that are not abstract and cannot be performed as a set of mental acts by a human. For example, an individual, or a plurality of individuals, cannot readily analyze and rank the vast amount of source code data employed to train one or more AI models. Also, one or more embodiments described herein can constitute a technical improvement over conventional AI model training by incorporating code complexity awareness into the training technique. Further, one or more embodiments described herein can have a practical application by improving the quality of AI models. For instance, various embodiments described herein can facilitate the training of AI models on task-relevant signals. Additionally, various embodiments described herein can control the order in which source code samples are fed to the AI model during training.

FIG. 1 illustrates a block diagram of an example, non-limiting system 100 that can incorporate code complexity awareness in the training of one or more AI models for one or more source code understanding tasks. Repetitive description of like elements employed in other embodiments described herein is omitted for the sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, a combination thereof, and/or the like) can cause the machines to perform the operations described.

As shown in FIG. 1, the system 100 can comprise one or more servers 102, one or more networks 104, and one or more input devices 106. The server 102 can comprise training component 110. The training component 110 can further comprise communications component 112 and extraction component 114. Also, the server 102 can comprise or otherwise be associated with at least one memory 116. The server 102 can further comprise a system bus 118 that can couple to various components such as, but not limited to, the training component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the training component 110 can be provided on the one or more servers 102, it should be appreciated that the architecture of system 100 is not so limited. For example, the training component 110, or one or more components of training component 110, can be located at another computer device, such as another server device, a client device, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more source code samples 122 and/or AI models 124 into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

For example, in one or more embodiments the one or more input devices 106 can be employed to enter one or more source code samples 122 into the system 100, which can be stored in the one or more memories 116. Further, the training component 110 can utilize the one or more source code samples 122 to train one or more AI models 124 (e.g., for one or more source code understanding tasks). In one or more embodiments, the one or more input devices 106 can also be employed to enter one or more AI models 124 into the system 100, which can be stored in the one or more memories 116 and/or trained by the training component 110. Further, in various embodiments, the one or more input devices 106 can be employed to define one or more settings and/or parameters of the AI model 124 training. For example, the one or more input devices 106 can be employed to define one or more code complexity metrics in accordance with one or more embodiments described herein. In various embodiments, the communications component 112 can share one or more inputs (e.g., entered into the system 100 via the one or more input devices 106) with the associate components of the training component 110 in accordance with one or more embodiments described herein.

In various embodiments, the one or more AI models 124 can be used to facilitate one or more machine learning tasks. In one or more embodiments, the AI models 124 can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). AI models 124 can learn through training, wherein data with known outcomes is inputted into the computer model, outputs regarding the data are compared to the known outcomes, and/or the weights of the computer model are autonomous adjusted based on the comparison to replicate the known outcomes. As the one or more AI models 124 train, the computer model can become increasingly accurate; thus, trained AI models 124 can accurately analyze data with unknown outcomes, based on lessons learning from training data, to facilitate one or more machine learning tasks. Example AI models 124 can include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), and/or neural turing machine ("NTM").

In one or more embodiments, the training component 110 can train one or more AI models 124 on one or more source code samples 122 for one or more source code understanding tasks, where the source code samples 122 can be ranked based on code complexity (e.g., as defined by one or more complexity metrics). For example, the extraction component 114 can extract one or more code complexity metrics from one or more source code samples 122. As referred to herein, the term "code complexity" can refer to the complexity inherent to a given computer application source code. Code complexity can affect the efficiency of computer software. For example, as code complexity increases, the probability of the source code sample comprising a defect can also increase.

In various embodiments, code complexity can be measured in terms of cyclomatic complexity and/or Halstead complexity via one or more complexity metrics 126, and/or a function of multiple complexity metrics 126. For example, the one or more complexity metrics 126 can be a measure of, but are not limited to: a cyclomatic complexity metric, source lines of code ("SLOC") (e.g., lines of source code and/or executable code), Halstead volume, maintainability index, coupling/depth of inheritance, cognitive complexity, rework ratio, program volume, a program difficulty calculation (e.g., the difficulty to write or understand the source code), an effort calculation (e.g., a measure of coding time), a program length measure, a program vocabulary measure, number of classes, number of comment lines, density of comment lines, number of directories, number of files, number of functions, number of projects in a view, number of statements, a combination thereof, and/or the like. In one or more embodiments, the one or more complexity metrics 126 can be function of one or more semantic artifacts included in the source code sample 122. Example artifacts can include, but are not limited to: decision points, if-conditions, iterative loops, number of linearly independent paths, number of commits modifying the given source code, number of developers contributing to the given source code, number of conversations associated with the given source code, a combination thereof, and/or the like. For instance, code complexity can be calculated based on the number of paths through a source code. Where the control flow of a function splits, the complexity can increase (e.g., a complexity counter can increase incrementally with each split).

In various embodiments, the extraction component 114 can analyze each source code sample 122 for training one or more AI models 124. Further, the extraction component 114 can extract one or more complexity metrics 126 with regards to each source code sample 122 to determine the code complexity of the source code sample 122. For example, the extraction component 114 can extract one type of complexity metric 126 from each of the source code samples 122 to characterize the code complexity of the source code samples 122. In another example, the extraction component 114 can extract multiple types of complexity metrics 126 from each source code samples 122 (e.g., extract two or more complexity metrics 126 per source code sample) to characterize the code complexity of the source code samples 122. In various embodiments, the extraction component 114 can characterize the code complexity of a source code samples 122 as a function of multiple complexity metrics 126 extracted from the source code sample 122. The extraction method employed by the extraction component 114 to extract the one or more complexity metrics 126 can vary depending on the complexity metric 126 being extracted. For example, the extraction component 114 can employ Frama-C to extract one or more complexity metrics 126. For instance, one or more complexity metrics 126 can be extracted by counting one or more relevant artifacts of the source code sample 122 (e.g., counting the lines of code). In another instance, the extraction component 114 can employ one or more analyzer tools to extract the one or more complexity metrics, including, but not limited to: a cyclomatic complexity analyzer (e.g., Lizard analyzer tool), a McCabe complexity analyzer (e.g., mccabe analyzer tool), pycodequal analyzer tool, xenon analyzer tool, cyclocomp analyzer tool, saikuro analyzer tool, cmetrics analyzer, cscout analyzer tool, a combination thereof, and/or the like.

In one or more embodiments, the extraction component 114 can store the one or more extracted complexity metrics 126 in the one or more memories 116 along with an identification of the associate source code sample 122 in one or more complexity databases 128. For example, the one or more complexity databases 128 can comprise one or more charts, tables, logs, and/or the like that lists the analyzed source code samples 122 and the extract complexity metrics 126 associated with each analyzed source code sample 122.

Figure 2:
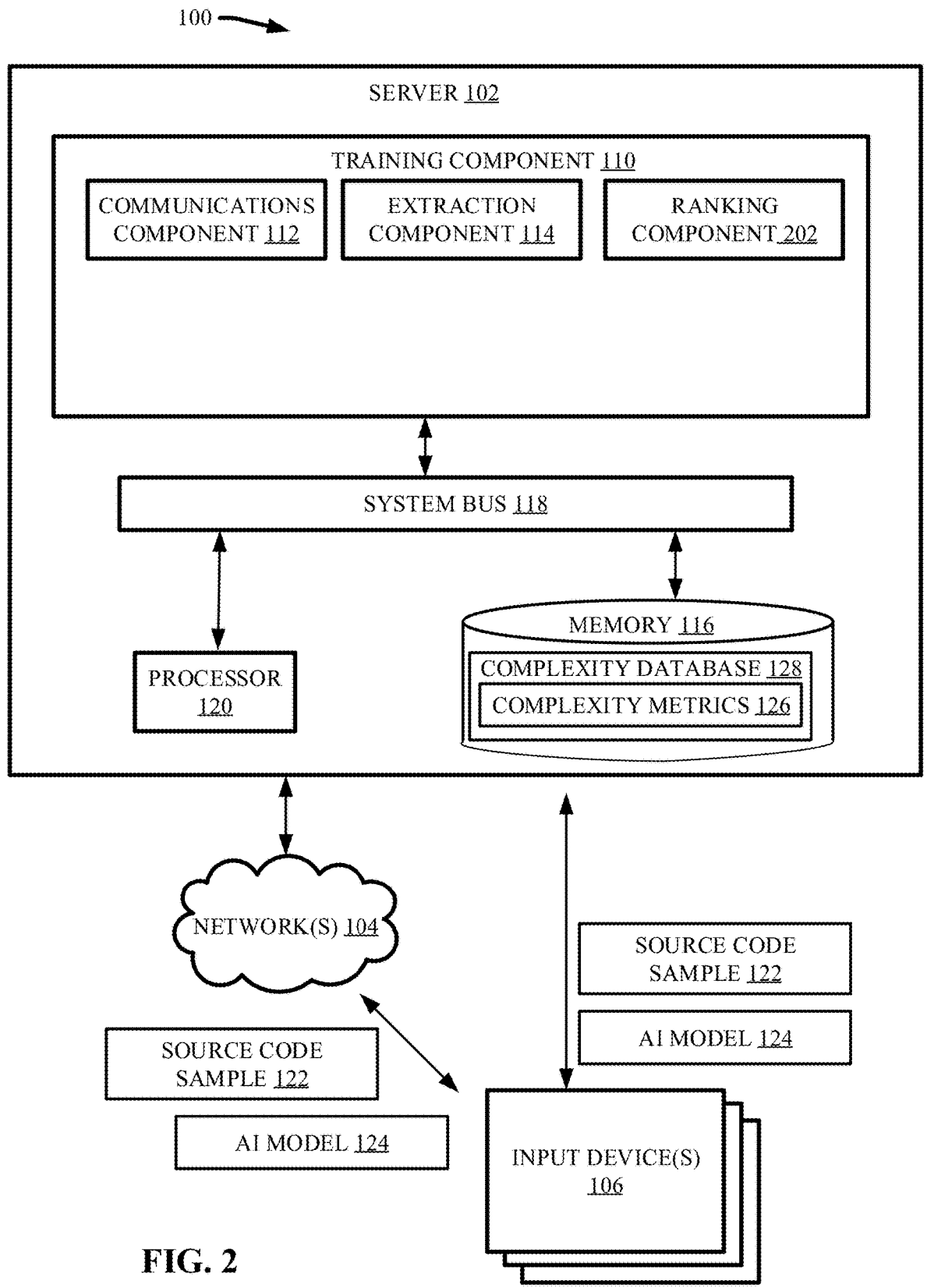
FIG. 2 illustrates a block diagram of an example, non-limiting system that can rank one or more source codes based on one or more extracted complexity metrics in accordance with one or more embodiments described herein.

FIG. 2 illustrates a diagram of the example, non-limiting system 100 further comprising ranking component 202 in accordance with one or more embodiments described herein. Repetitive description of like elements employed in other embodiments described herein is omitted for the sake of brevity. In various embodiments, the ranking component 202 can rank the one or more source code samples 122 in a progressive order of code complexity based on the one or more extract complexity metrics 126.

For example, the ranking component 202 can rank the source code samples 122 included in the training by increasing code complexity, as defined by one or more extracted complexity metrics 126. The complexity ranking performed by the ranking component 202 can be based on, for example: a single extracted complexity metric 126, multiple complexity metrics 126, and/or a function of multiple complexity metrics 126. In one or more embodiments, the one or more input devices 106 can be employed to define which one or more complexity metrics 126 can serve as the basis for the ranking performed by the ranking component 202. For instance, the one or more input devices 106 can be employed to instruct the ranking component 202 to rank the source code samples 122 according to their respective SLOC measurement. In one or more embodiments, the ranking component 202 can rank the one or more source code samples 122 based on a function (e.g., defined by the one or more input devices 106) of multiple complexity metrics 126 extracted by the extraction component 114. In various embodiments, the ranking component 202 can select a complexity metric 126 for the basis of the ranking based on the type of AI model 124 to be trained and/or the source code understanding task to be completed. Through the selection of which complexity metrics 126 form the basis of the ranking, the one or more input devices 106 can be employed to influence the learning of the AI model 124.

In various embodiments, the training component 110 can sample the one or more sample source code samples 122 in an order based on the ranking performed by the ranking component 202. For example, the training component 110 can progressively sample increasingly complex (e.g., in terms of code complexity) source code samples 122. Thereby, the training component 110 can train the one or more AI models 124 on less complex (e.g., in terms of code complexity) source code samples 122 initially during training, and increase sample complexity progressively. For example, the training component 110 can sample the source code samples 122 in accordance with the complexity based ranking performed by the ranking component 202.

The source code samples 122 can contain the same traits desired for learning by the AI model, while initial source code samples 122 can be relatively easier for the AI model to accurately analyze (e.g., as compared to more complex source code samples of the training dataset). Progressively selecting source code samples 122 with increasing code complexity can improve AI model performance. For example, source code samples 122 with greater code complexity can have higher amounts of noise (e.g., in the form of statements and/or constructs not relevant to the source code understanding task assigned to the AI model 124). By reserving the introduction of noisy samples until later in the training process, the AI model 124 can leverage prior training iterations to refine its learning.

To demonstrate the efficacy of the various embodiments described herein, the system 100 was employed with regards to a vulnerability detection use-case on a plurality of datasets; however, the various embodiments are applicable to other source code understanding tasks. Example datasets employed to demonstrate the efficacy of the system 100 include: the s-bAbI synthetic dataset ("s-bAbI"), the Juliet Test Suite ("Juliet"), and the D2A dataset. The s-bAbI, Juliet, and D2A datasets are employed to demonstrate the efficacy of the various embodiments described herein; however, the features of the training component 110 are not limited to the example s-bAbI, Juliet, and D2A datasets, rather other source code datasets can be analyzed. S-bAbI contains syntactically valid C programs with non-trivial control flow, focusing on the buffer overflow vulnerability. For the purpose of vulnerability detection task, the s-bAbI generator can be used to create a dataset, where samples with the "UNSAFE" tag can be labelled 1 and samples with the "SAFE" tag can be labelled 0. The Juliet dataset contains synthetic examples with different vulnerability types, designed for testing static analyzer. From Juliet test cases, samples tagged as "bad", and with clear bug information as per Juliet's manifest.xml, can be labeled as 1; while samples tagged as "good" can be labelled as 0. The D2A dataset is a real-world vulnerability detection dataset built over multiple Github projects—OpenSSL, FFMpeg, HTTPD, Nginx, and libtiff. The D2A dataset contains in-depth trace level bug information, derived using differential analysis atop the Infer static analyzer outputs of consecutive repository versions, before and after bug-fixing commits. Function level sample extraction from D2A traces can yield training functions labeled as 1 (e.g., from before-fix commits) and 0 (e.g., from after-fix commits).

In one or more embodiments, a graph neural network ("GNN") AI model 124 can be employed to demonstrate the efficacy of the system 100. GNN models can operate on graph-level representations of source code. For instance, a GNN model can learn bug patterns in a code property graph. In various examples, the embedding size can be 64, followed by a GNN layer with hidden size of 256 and 5 unrolling time steps. The node representations can be obtained via summation of all node tokens' embedding, and the graph representation read-out can be constructed as a global attention layer. The final prediction can be generated by a 2-layer multilayer perceptron with output dimensions of 256 and 2. In accordance with various embodiments described herein, the training component 110 can facilitate training the one or more AI models 124 over various data splits (e.g., 80:10:10 train:validate:test split) and/or optimization schemes (e.g., dropout and/or different training losses, such as cross-entropy loss).

Figure 3:
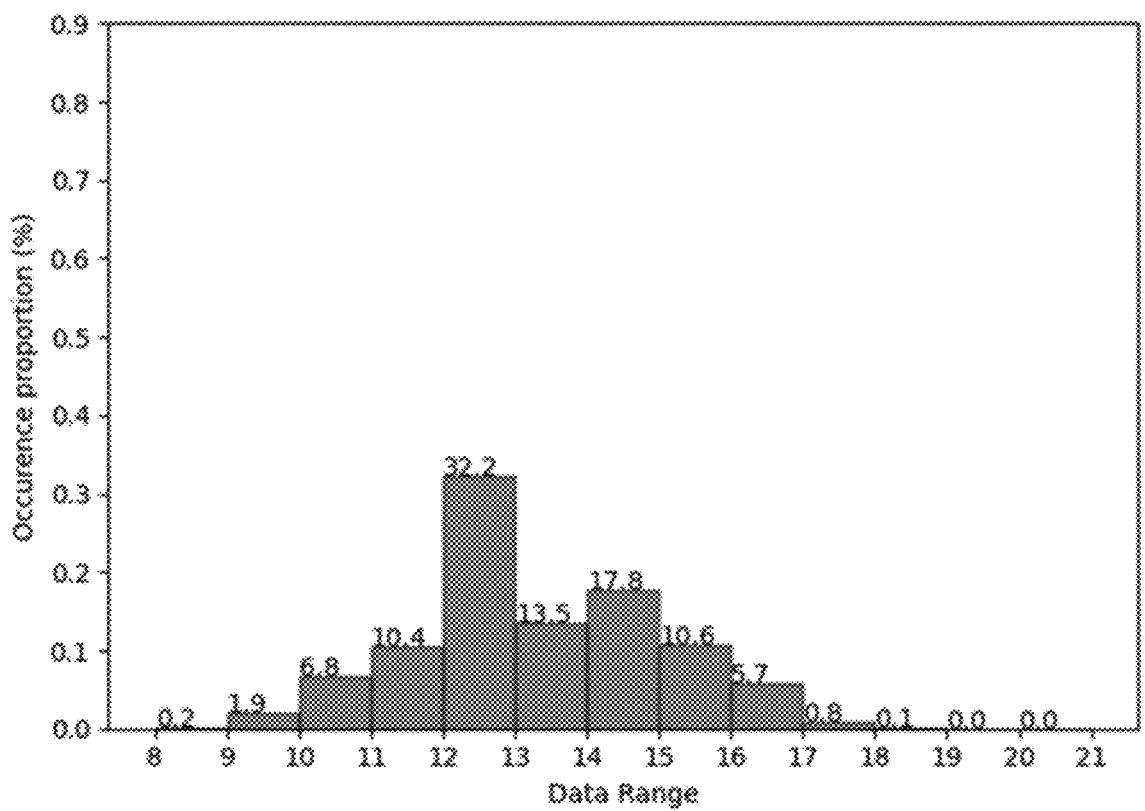
FIG. 3 illustrates a diagram of an example, non-limiting diagram that can depict a complexity distribution regarding a plurality of source code samples that can be used to train one or more artificial intelligence models in accordance with one or more embodiments described herein.

FIG. 3 illustrates a diagram of an example, non-limiting graph 300 that can depict the complexity distribution for s-bAbI source code samples with regards to a difficulty measure complexity metric 126 in accordance with one or more embodiments described herein. Repetitive description of like elements employed in other embodiments described herein is omitted for the sake of brevity. As shown in FIG. 3, the s-bAbI dataset can comprise source code samples 122 of varying code complexity (e.g., as characterized by the difficult measure complexity metric). In various embodiments, the extraction component 114 can generate graph 300 based on the complexity metric 126 extraction in accordance with various embodiments described herein.

Figure 4:
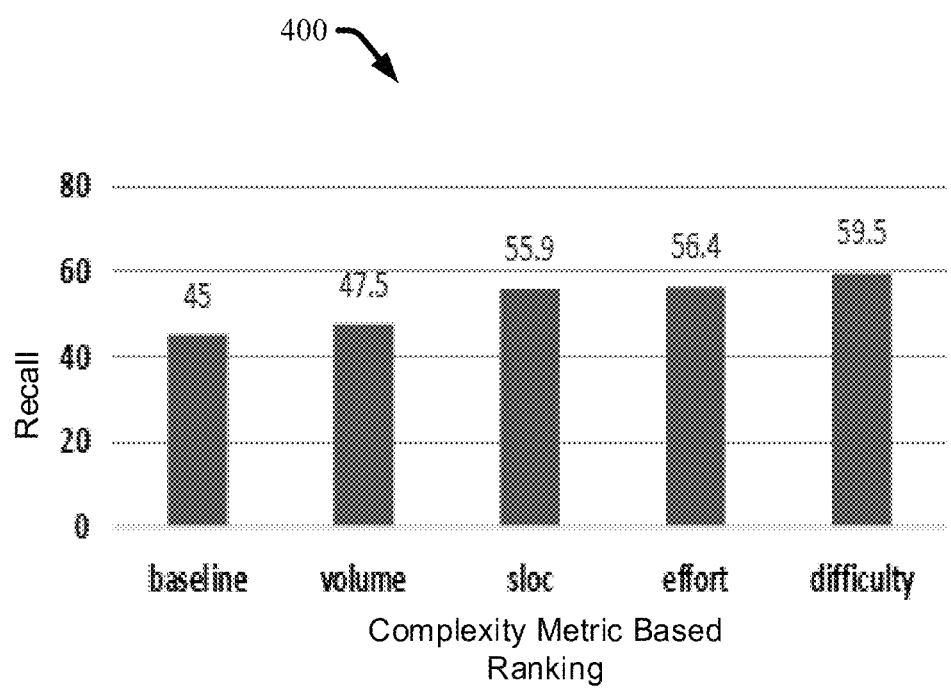
FIGS. 4-7 illustrate diagrams of example, non-limiting diagrams that can demonstrate the efficacy of complexity based training of one or more artificial intelligence models for one or more understanding source code tasks in accordance with one or more embodiments described herein.

FIG. 4 illustrates a diagram of an example, non-limiting graph 400 that can demonstrate the efficacy of the system 100 as compared to traditional training techniques in accordance with one or more embodiments described herein. Repetitive description of like elements employed in other embodiments described herein is omitted for the sake of brevity. Graph 400 can demonstrate that the performance of an AI model 124 can be markedly improved by training the AI model 124 on source code samples 122 on increasingly complex source code samples 122. While recall is utilized as a performance metric for evaluating the performance of the example AI model 124 in FIGS. 4-5; the enhanced performance is not limited to signal awareness.

Graph 400 depicts results generated from employing the system 100 on the s-bAbI dataset with regards to a GNN AI model. As shown in FIG. 4: "baseline" can refer to results regarding a traditional training configuration (e.g., randomized sampling); "volume" can refer to results regarding the system 100 training the AI model 124 in which a volume measure complexity metric 126 is used to rank the source code samples 122; "sloc" can refer to results regarding the system 100 training the AI model 124 in which a SLOC complexity metric 126 is used to rank the source code samples 122; "effort" can refer to results regarding the system 100 training the AI model 124 in which an effort measure complexity metric 126 is used to rank the source code samples 122; "difficulty" can refer to results regarding the system 100 training the AI model 124 in which a difficulty measure complexity metric 126 is used to rank the source code samples 122.

As shown in FIG. 4, the recall metric can be used to demonstrate improved AI model 124 performance that can be achieved via the training component 110. In the context of vulnerability detection (e.g., the source code understanding task employed to generate the graphs described herein, such as graph 400), the recall metric can measure the proportion of vulnerable samples which the AI model 124 products correctly (e.g., true positive predictions), with the remaining predictions being false negatives. For example, each true positive prediction can be subjected to a Delta-Debugging style minimization cycle, with the AI model 124 in the loop. Subsequently, the AI model 124 can be queried for its prediction on each true positive prediction samples 1-minumal version. Further the 1-minimal can be checked for the presence or absence of the original program sample's bug. Graph 400 demonstrates that the complexity based ranked training performed by the system 100 can boost the AI model's performance with code complexity awareness training. For example, ranking based on the difficulty measure complexity metric 126 can achieve a 32% improvement, as compared to traditional training techniques.

Figure 5:
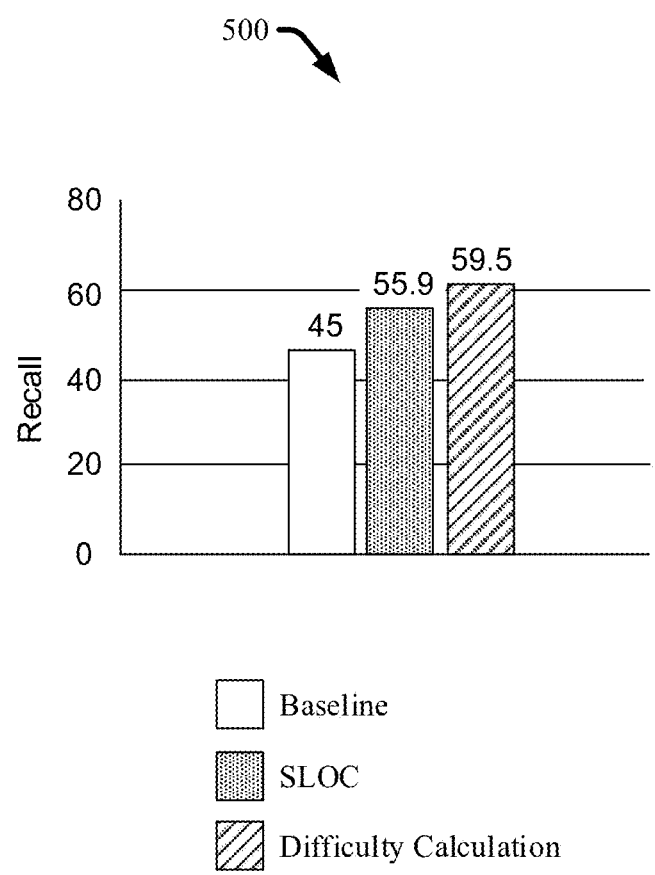

FIG. 5 illustrates a diagram of an example, non-limiting graph 500 that can demonstrate the efficacy of the system 100 as compared to traditional training techniques in accordance with one or more embodiments described herein. Repetitive description of like elements employed in other embodiments described herein is omitted for the sake of brevity. Graph 500 regards a GNN AI model across multiple complexity ranked training schemes. While FIG. 5 employs a GNN AI model 124 to demonstrate the efficacy of various embodiments described herein, the training component 110 can be employed to enhance the training and/or performance of other types of AI models 124 (e.g., the features of the training component 110 are not limited to GNN AI models 124).

Figure 6:
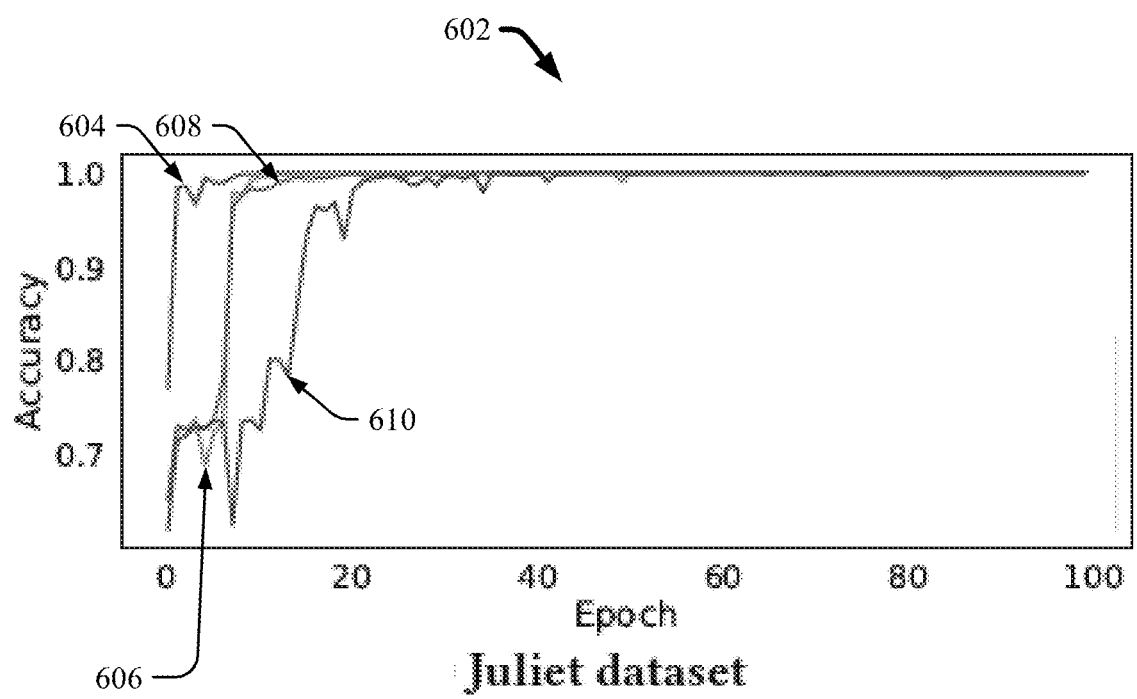

FIG. 6 illustrates a diagram of example, non-limiting graph 602 that can compare validation performance curves for an AI model 124 trained via various training configurations in accordance with one or more embodiments described herein. Repetitive description of like elements employed in other embodiments described herein is omitted for the sake of brevity. Graph 602 can illustrate how the model learning can change with complexity ranked training for a GNN AI model 124 trained on the Juliet dataset. Line 604 can regard a random sampling training configuration. Line 606 can regard a complexity ranked sampling based on the SLOC complexity metric 126. Line 608 can regard a complexity ranked sampling based on the difficulty measure complexity metric 126. Line 610 can regard a complexity ranked sampling based on the volume measure complexity metric 126. Line 612 can regard a complexity ranked sampling based on the effort measure complexity metric 126.

Graph 602 can depict validation accuracy curves for various training configurations, including random sampling training versus complexity ranked training schemes. The validation accuracy curves can represent the AI model's interim accuracy on the validation set as it progresses along its training FIG. 6 illustrates that both random sampling and complexity ranked sampling schemes can reach greater than 90% accuracy via different training routes with complexity ranked sampling in accordance with the various embodiments described herein.

Figure 7:
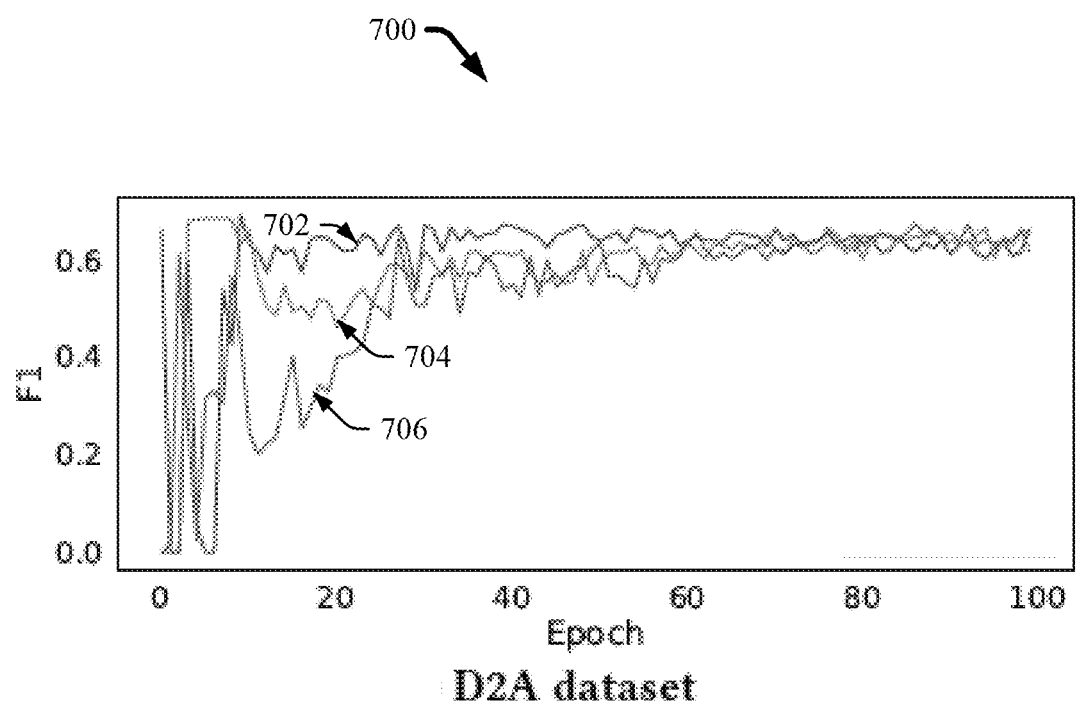

FIG. 7 illustrates a diagram of an example, non-limiting graph 700 that can compare validation performance curves for an AI model 124 trained via various training configurations in accordance with one or more embodiments described herein. Repetitive description of like elements employed in other embodiments described herein is omitted for the sake of brevity. Graph 700 can illustrate how the model learning can change with complexity ranked training for a GNN AI model 124 trained on the D2A dataset. While a GNN AI model 124 and the D2A dataset are employed to demonstrate the efficacy of various embodiments described herein, the architecture of the system 100 is not so limited. For instance, the training component 110 can facilitate complexity based sampling for a variety of AI models 124 on a variety of datasets in accordance with one or more embodiments described herein. Line 702 can regard a random sampling training configuration. Line 704 can regard a complexity ranked sampling based on the cyclomatic complexity metric 126. Line 706 can regard a complexity ranked sampling based on the SLOC complexity metric 126. In various embodiments, the training routes and/or leaning behavior can vary for different dataset and model metric combinations (e.g., complexity based sampling can achieve optimal accuracy in the same, or fewer, epochs as natural training).

Figure 8:
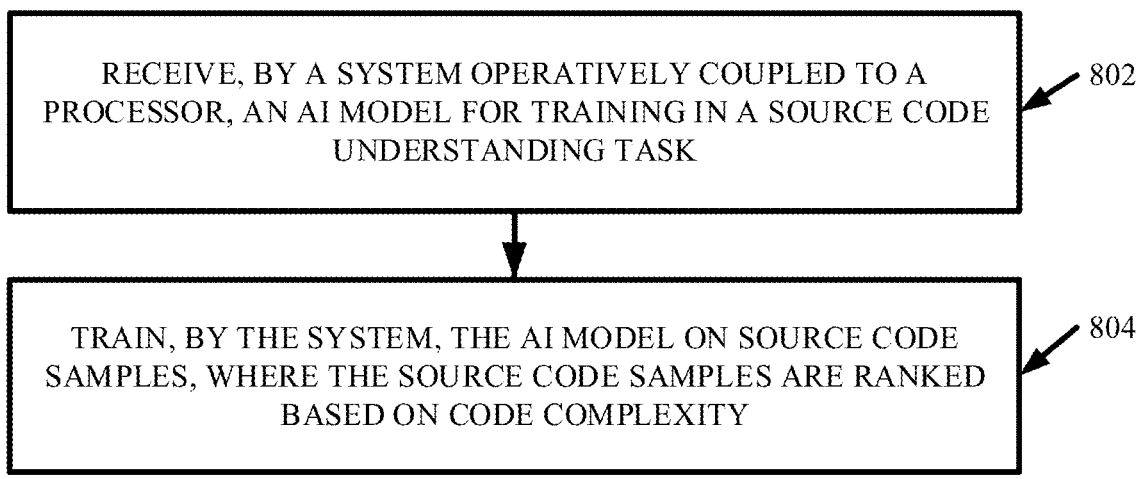
FIGS. 8-9 illustrate flow diagrams of example, non-limiting computer-implemented methods that can facilitate training one or more artificial intelligence models based on source code samples ranked by complexity in accordance with one or more embodiments described herein.

FIG. 8 illustrates a flow diagram of an example, non-limiting computer-implemented method 800 that can be employed by the system 100 to train one or more AI models 124 in accordance with one or more embodiments described herein. Repetitive description of like elements employed in other embodiments described herein is omitted for the sake of brevity.

At 802, the computer-implemented method 800 can comprise receiving (e.g., via communications component 112, network 104, and/or input device 106), by a system 100 operatively coupled to a processor 120, one or more AI models 124 for training in one or more source code understanding tasks. Example source code understanding tasks can include, but are not limited to: defect detection, code summarization, code completion, bug fixing, function and variable naming, code recommendation, software development workflows, a combination thereof, and/or the like.

At 804, the computer-implemented method 800 can comprise training (e.g., via training component 110), by the system 100, the one or more AI models 124 on source code samples 122, where the source code samples 122 can be ranked based on code complexity. In accordance with various embodiments described herein, the code complexity of the source code samples 122 can be characterized by one or more code complexity metrics 126 (e.g., which can be extracted, measured, and/or determined by the extraction component 114 in accordance with various embodiments described herein). In one or more embodiments, the training at 804 can progressively sample source code samples 122 with increasing code complexity.

Figure 9:
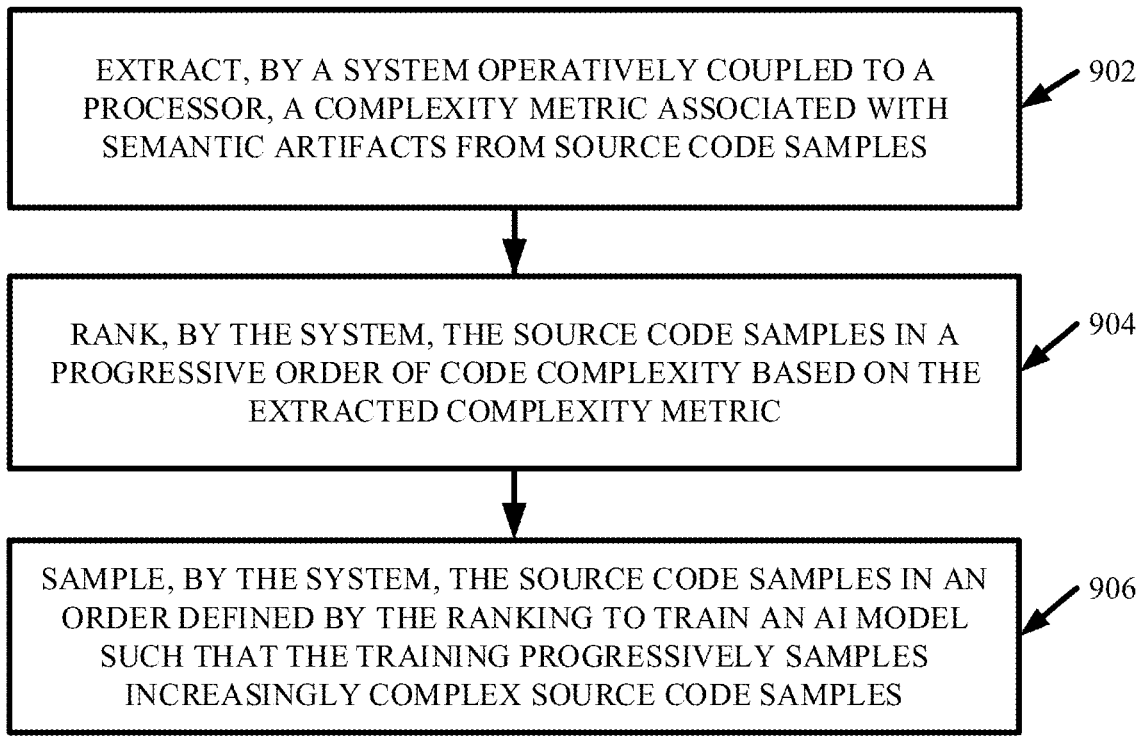

FIG. 9 illustrates a flow diagram of an example, non-limiting computer-implemented method 900 that can be employed by the system 100 to train one or more AI models 124 in accordance with one or more embodiments described herein. Repetitive description of like elements employed in other embodiments described herein is omitted for the sake of brevity.

At 902, the computer-implemented method 900 can comprise extracting (e.g., via extraction component 114), by a system 100 coupled to a processor 120, one or more complexity metrics 126 associated with one or more semantic artifacts from source code samples 122. For example, the one or more complexity metrics 126 can characterize cyclomatic complexity and/or Halstead complexity of the source code samples 122.

At 904, the computer-implemented method 900 can comprise ranking (e.g., via ranking component 202), by the system 100, the source code samples in a progressive order of code complexity based on the one or more extracted complexity metrics 126. For example, the source code samples 122 can be ranked in accordance with increasing code complexity. At 906, the computer-implemented method 900 can comprise sampling (e.g., via training component 110), by the system 100, the source code samples 122 in an order defined by the ranking at 904 to train one or more AI models 124 such that the training progressively samples increasingly complex source code samples 122.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
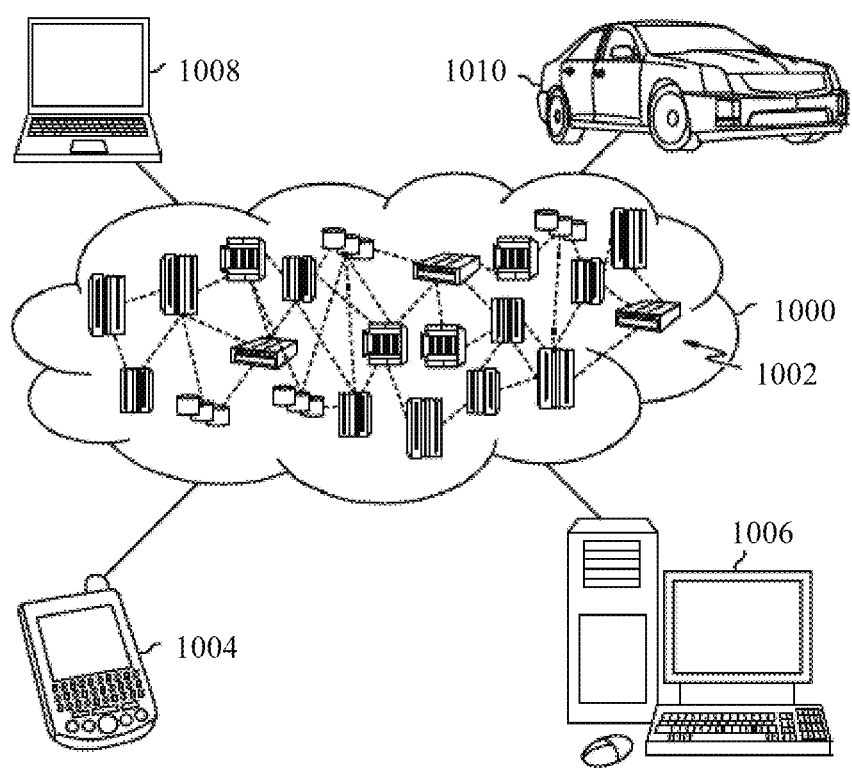
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
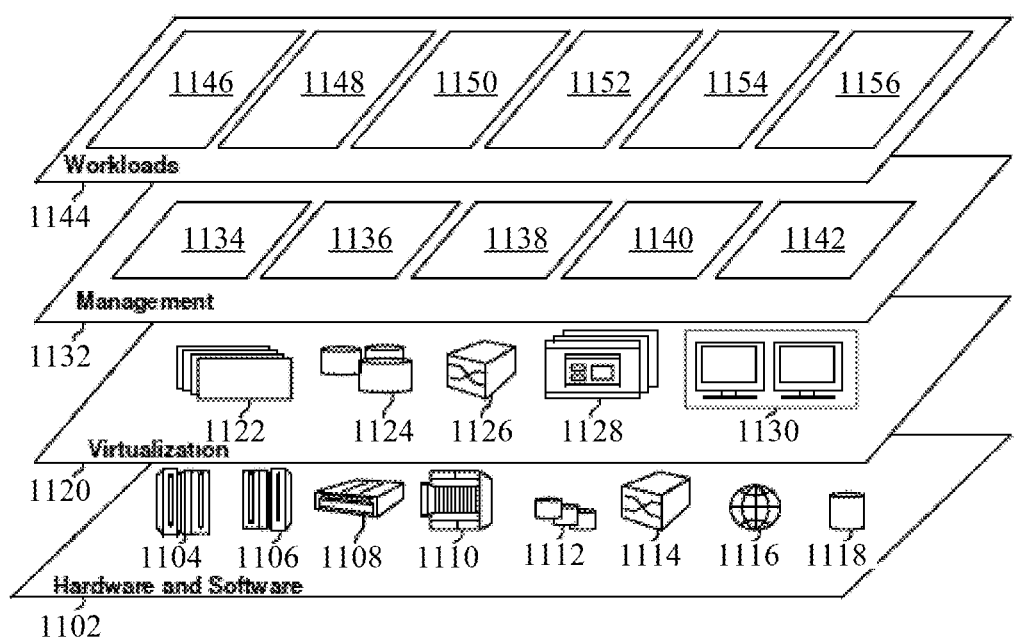
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for the sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and AI model training 1156. Various embodiments of the present invention can utilize the cloud computing environment described with reference to FIGS. 10 and 11 to train one or more AI models for a source code understanding task via a complexity based training scheme.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
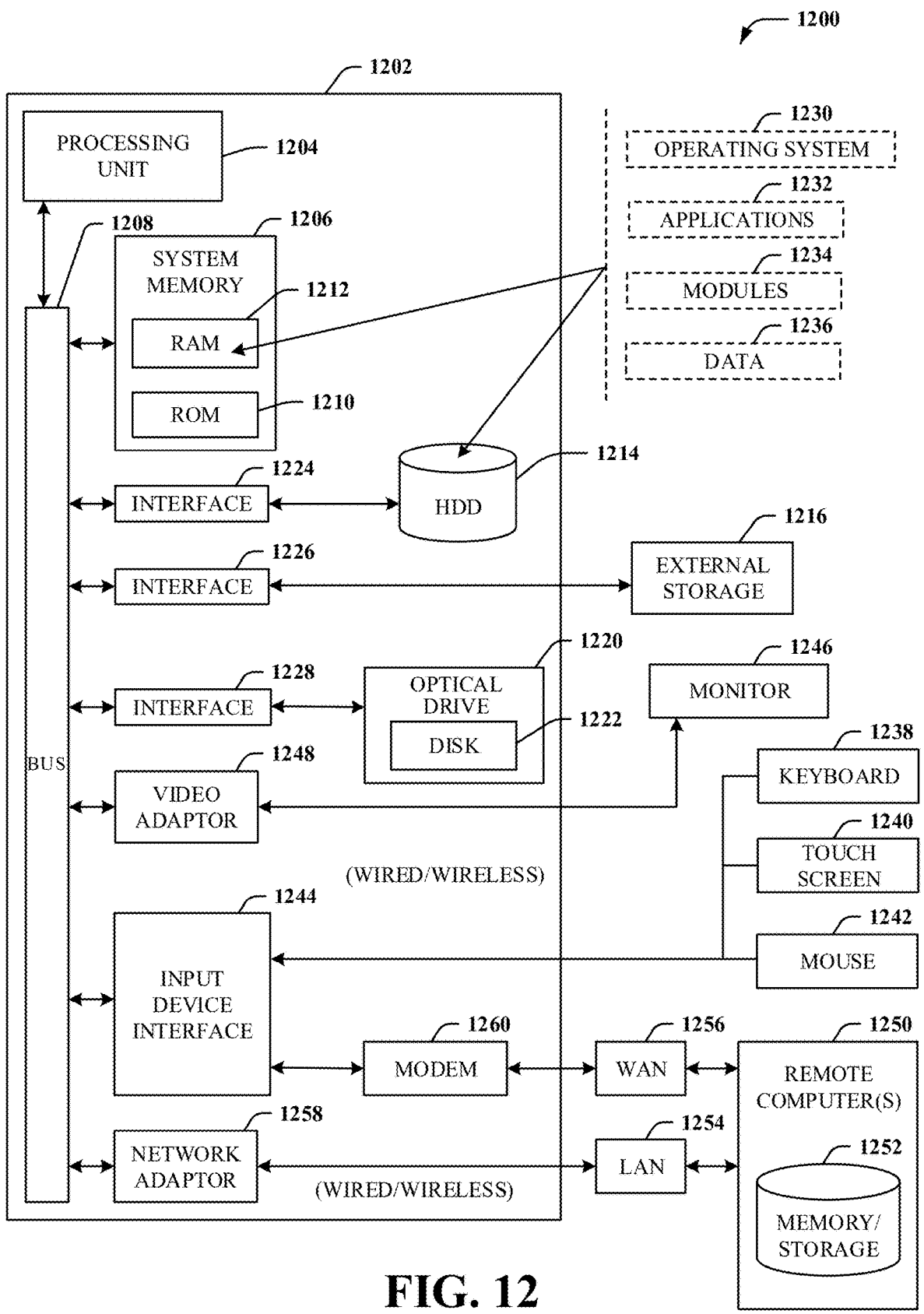
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, and/or the like, that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, a combination thereof, and/or the like) and an optical disk drive 1220 (e.g., which can read or write from a CD-ROM disc, a DVD, a BD, and/or the like). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, and/or the like.

A monitor 1246 or other type of display device can be also connected to the system bus 1208 via an interface, such as a video adapter 1248. In addition to the monitor 1246, a computer typically includes other peripheral output devices (not shown), such as speakers, printers, a combination thereof, and/or the like.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN")

1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, and/or the like), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor, operably coupled to the memory, and that executes at least one of the computer executable components that:
selects, from a group of complexity code metrics, a defined code complexity metric that when employed for ranking training samples to train neural network models for source code understanding tasks reduces false positive errors and false negative errors in performing the source code understanding tasks by the neural network models as compared to unranked training samples for training the neural network models;
determines respective code complexity values of training source code samples based on the defined code complexity metric, wherein the respective code complexity value of a training source code sample represents a measure of complexity of source code of the training source code sample;
ranks the training source code samples based on the respective code complexity values; and
iteratively trains, using the training source code samples and beginning with a least complex training source code sample in the ranking according to the respective code complexity values, a neural network model to perform a source code understanding task associated with understanding a defined task-relevant aspect of source code samples, wherein each subsequent iteration employs a next least complex training source code sample in the ranking according to the respective code complexity values to mitigate the false positive errors and the false negative errors in the source code understanding task by the neural network model.

2. The system of claim 1, wherein the defined code complexity metric is based on at least one semantic artifact associated with the training source code samples.

3. The system of claim 2, wherein the at least one semantic artifact comprises at least one of a decision-point, an if-condition, an iterative loop, a quantity of linearly independent paths, or a quantity of code edits, a quantity of developers that contributed lines of code.

4. The system of claim 1, wherein the defined code complexity metric is based on a cyclomatic complexity or a Halstead complexity.

5. The system of claim 1, wherein the defined code complexity metric is based on at least one of a quantity of source lines of code, a quantity of comment lines, a quantity of functions, a quantity of classes, a program length, a program vocabulary, a cognitive complexity, a measure of coding time, a maintainability index, a rework ratio, or a program difficulty.

6. The system of claim 1, wherein the source code understanding task comprises at least one of defect detection, code summarization, code completion, bug fixing, function naming, variable naming, code recommendation, or software development workflow.

7. The system of claim 1, wherein the iterative training of the neural network model from the least complex training source code sample to most complex training source code sample improves an ability of the neural network model to differentiate between signal data and noise data in the training source code samples.

8. A computer-implemented method, comprising:
selecting, by a system operatively coupled to a processor, from a group of complexity code metrics, a defined code complexity metric that when employed for ranking training samples to train neural network models for source code understanding tasks reduces false positive errors and false negative errors in performing the source code understanding tasks by the neural network models as compared to unranked training samples for training the neural network models;
determining, by the system, code complexity values of training source code samples based on the defined code complexity metric, wherein the respective code complexity value of a training source code sample represents a measure of complexity of source code of the training source code sample;
ranking, by the system, the training source code samples based on the respective code complexity values; and
iteratively training, by the system, using the training source code samples and beginning with a least complex training source code sample in the ranking according to the respective code complexity values, a neural network model to perform a source code understanding task associated with understanding a defined task-relevant aspect of source code samples, wherein each subsequent iteration employs a next least complex training source code sample in the ranking according to the respective code complexity values to mitigate the false positive errors and the false negative errors in the source code understanding task by the neural network model.

9. The computer-implemented method of claim 8, wherein the defined code complexity metric is based on at least one semantic artifact associated with the training source code samples.

10. The computer-implemented method of claim 9, wherein the at least one semantic artifact comprises at least one of a decision-point, an if-condition, an iterative loop, a quantity of linearly independent paths, or a quantity of code edits, a quantity of developers that contributed lines of code.

11. The computer-implemented method of claim 8, wherein the defined code complexity metric is based on a cyclomatic complexity or a Halstead complexity.

12. The computer-implemented method of claim 8, wherein the defined code complexity metric is based on at least one of a quantity of source lines of code, a quantity of comment lines, a quantity of functions, a quantity of classes, a program length, a program vocabulary, a cognitive complexity, a measure of coding time, a maintainability index, a rework ratio, or a program difficulty.

13. The computer-implemented method of claim 8, wherein the source code understanding task comprises at least one of defect detection, code summarization, code completion, bug fixing, function naming, variable naming, code recommendation, or software development workflow.

14. The computer-implemented method of claim 8, wherein the iterative training of the neural network model from the least complex training source code sample to most complex training source code sample improves an ability of the neural network model to differentiate between signal data and noise data in the training source code samples.

15. A computer program product for employing source code complexity awareness with a neural network model, the computer program product comprising a computer readable storage medium having program instructions embodied therewith, the program instructions executable by a processor to cause the processor to:
select, by the processor, from a group of complexity code metrics, a defined code complexity metric that when employed for ranking training samples to train neural network models for source code understanding tasks reduces false positive errors and false negative errors in performing the source code understanding tasks by the neural network models as compared to unranked training samples for training the neural network models;
determine, by the processor, respective code complexity values of training source code samples based on the defined code complexity metric, wherein the respective code complexity value of a training source code sample represents a measure of complexity of source code of the training source code sample;
rank, by the processor, the training source code samples based on the respective code complexity values; and
iteratively train, by the processor, using the training source code samples and beginning with a least complex training source code sample in the ranking according to the respective code complexity values, the neural network model to perform a source code understanding task associated with understanding a defined task-relevant aspect of source code samples, wherein each subsequent iteration employs a next least complex training source code sample in the ranking according to the respective code complexity values to mitigate the false positive errors and the false negative errors in the source code understanding task by the neural network model.

16. The computer program product of claim 15, wherein the defined code complexity metric is based on at least one semantic artifact associated with the training source code samples.

17. The computer program product of claim 16, wherein the at least one semantic artifact comprises at least one of a decision-point, an if-condition, an iterative loop, a quantity of linearly independent paths, or a quantity of code edits, a quantity of developers that contributed lines of code.

18. The computer program product of claim 15, wherein the defined code complexity metric is based on a cyclomatic complexity or a Halstead complexity.

19. The computer program product of claim 15, wherein the defined code complexity metric is based on at least one of a quantity of source lines of code, a quantity of comment lines, a quantity of functions, a quantity of classes, a program length, a program vocabulary, a cognitive complexity, a measure of coding time, a maintainability index, a rework ratio, or a program difficulty.

20. The computer program product of claim 15, wherein the source code understanding task comprises at least one of defect detection, code summarization, code completion, bug fixing, function naming, variable naming, code recommendation, or software development workflow.

* * * * *